C. C. CULVER.
LOCALIZER.
APPLICATION FILED SEPT. 4, 1920.
1,393,431.
Patented Oct. 11, 1921.
2 SHEETS—SHEET 1.
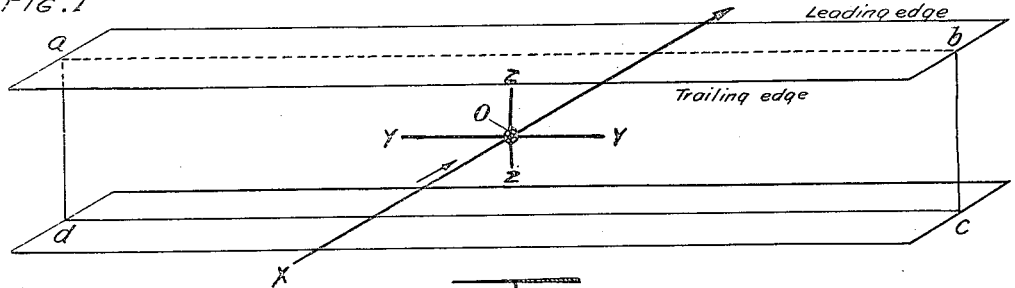
FIG. 1
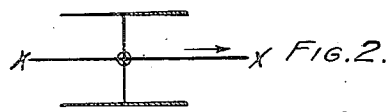
FIG. 3.    FIG. 2.
FIG. 5.    FIG. 4.
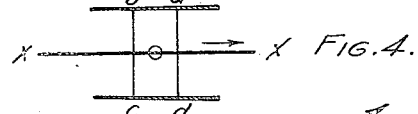
FIG. 7.    FIG. 6.
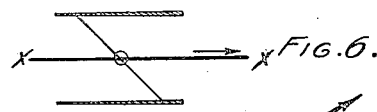
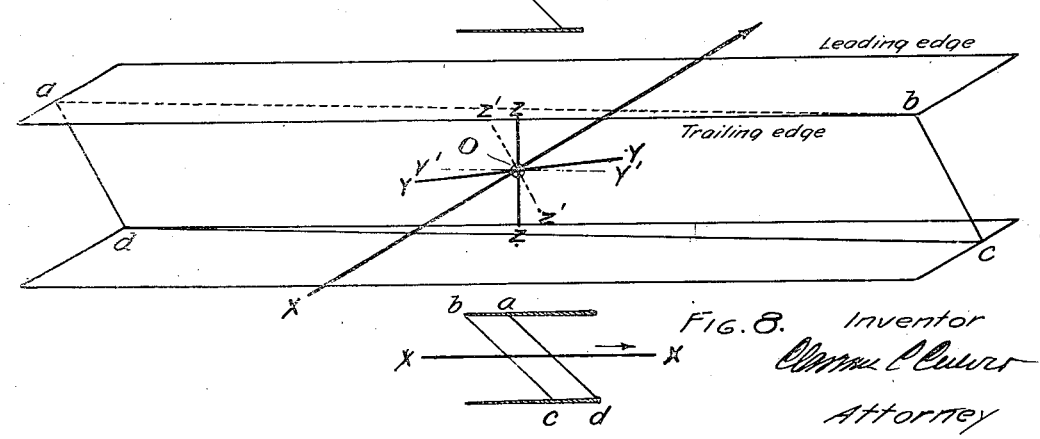
FIG. 8.
Inventor
Attorney

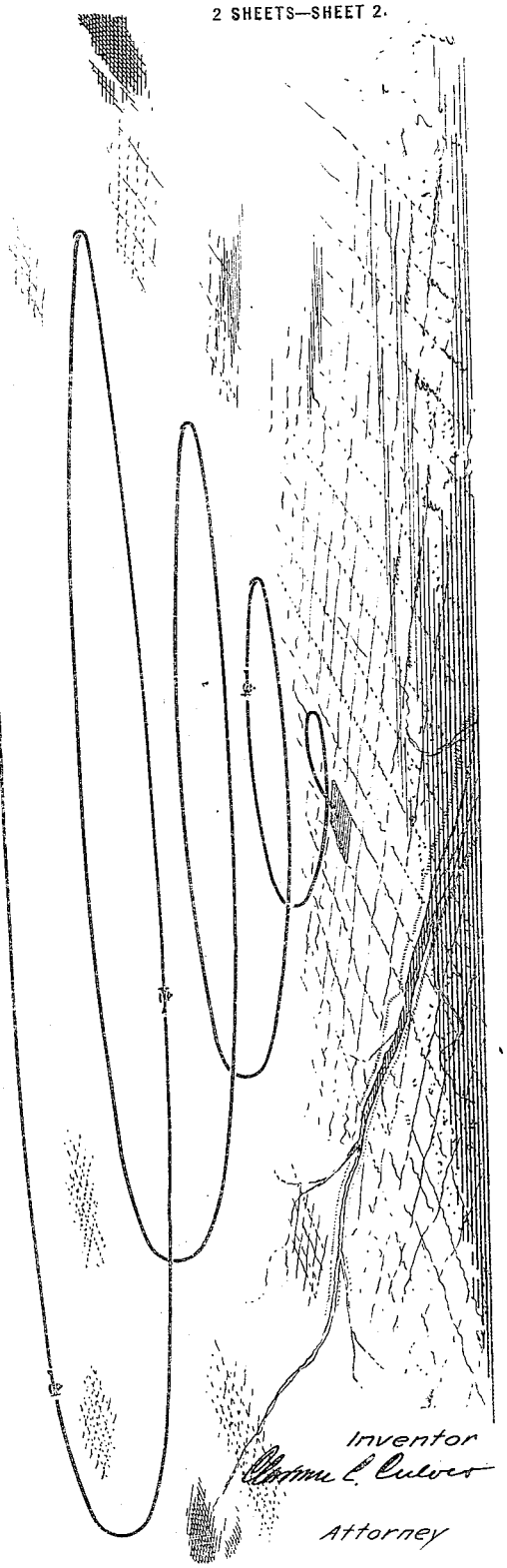

UNITED STATES PATENT OFFICE.

CLARENCE CURTIS CULVER, OF THE UNITED STATES ARMY.

LOCALIZER.

1,393,431.  Specification of Letters Patent.  Patented Oct. 11, 1921.

Application filed September 4, 1920. Serial No. 408,319.

*To all whom it may concern:*

Be it known that I, CLARENCE CURTIS CULVER, of the United States Army, a citizen of the United States, residing at Army and Navy Club, Washington, D. C., have invented certain new and useful Improvements in Localizers, of which the following is a specification.

This invention relates to radio direction finding apparatus in general and more particularly to radio localizer, or means for definitely locating a given point by radio and maintaining definite knowledge of the location of said point for a desired period of time. This embodiment of my invention relates more particularly to a localizer for use on aircraft to enable the same to be brought into a landing field properly in cloudy weather or darkness.

The types of direction finders thus far known provide means whereby the aviator may, at any time during his flight, determine the direction of a radio station to which he is flying and enable him to steer a straight course to that point, but it is of no use to him in effecting a landing if the ground is obscured by intervening clouds. In case for example, that the radio station toward which the aviator is flying is located actually at the landing field nearing the field and keeping the airplane pointed in the direction of the station and flying say at one hundred and fifty feet per second, the station will eventually be found to be to the rear of the airplane. The aviator has reached the vicinity of the field and has passed directly over the field or to one side, or at any rate he has gone beyond the station. While in the vicinity of the station the angular direction of the station from the airplane changes rapidly, in fact too rapidly to be followed by the flight of the machine or even by the readings of the direction finder thereon. As the airplane neared the station one reading showed it to be in front of the machine. The next reading taken immediately after the first showed an uncertain reading due to a rapidly angular change in the direction of the station, and the next reading showed the station to be in the rear. By the time the readings of the direction finder are staple the plane will have passed two or three miles beyond the field. The pilot will then reverse his course and again pass the station without being able to ascertain its exact location. Assume that the field is obscured from the view of the aviator by intervening clouds above which he is flying by the use of his aneroid the pilot can estimate his altitude but by the means so far developed can not be sure enough of the exact location of his field to assure him that he will be over the same after descending from these clouds. The clouds extend within a few hundred feet of the ground with the constant poor visibility and danger of striking obstructions, such as water towers, smoke stacks, and the like, on coming to the field.

It is the purpose of this invention to solve the problem of providing a means for enabling pilots to maintain constant communication with the knowledge of the location of the field so as to enable him to make a proper landing under such adverse conditions as have been mentioned.

In attempting to solve this problem it has been proposed to project by radio a beacon or directly upwardly extending shaft of radio energy so that the pilot upon passing over said area will be aware that the instant he came in contact with the same the field would be directly below him. The chances however of striking this limited area in the first place would be few and the probability of his being able to remain in communication with the beacon in his descent through the clouds would be limited to the extreme of impracticability.

Direction finding equipment of today for both ground and air operates in two dimensions only, the third dimension being the axes of the rotation of the loop or other direction finding aerial system. Science will undoubtedly bring to light a direction finder which will give the direction in three dimensions but for the present we must operate with the two dimension apparatus.

My invention as disclosed in the accompanying specification and illustrated in the drawings attached thereto proposes to enable a two dimension apparatus as described to be used as a localizer.

Figure 1 is a diagrammatic view in perspective of the wings of the aircraft with the plane of direction of the radio receiving device shown perpendicular to the longitudinal axis of the aircraft;

Fig. 2 is a side elevation of Fig. 1;

Fig. 3 is a diagrammatic view in perspective of the aircraft with the plane of direction of the radio receiving apparatus shown as including the vertical axis of the plane but inclined to the horizontal and lateral axes thereof;

Fig. 4 is a side elevation of Fig. 3;

Fig. 5 is a diagrammatic view in perspective of the air craft as described with the plane of direction of the radio receiving apparatus including the lateral axis of the plane but inclined to the vertical and longitudinal axes thereof;

Fig. 6 is a side view of Fig. 5;

Fig. 7 is a diagrammatic view in perspective of the aircraft as described with the plane of direction of the radio receiving apparatus at an angle to all three longitudinal axes of the plane;

Fig. 8 is a side view of Fig. 7, and

Fig. 9 shows the course to be followed by aircraft in landing with the device as shown in Figs. 7 and 8.

In the drawings x—x indicates the longitudinal axis of the airplane, y—y the lateral, and z—z the vertical. The parallelogram a, b, c, d, indicates the plane of direction established by the radio system familiar in direction finding apparatus. 0 is the intersection of the three axes as diagrammatically shown. y'—y' is a section of a line formed by the intersection of a horizontal plane through y—y, and the plane of direction of radio receiving loops when disposed at such an angle to the lateral axis as is shown in Figs. 3 and 7.

z'—z' is a section of a line formed by the intersection of the vertical plane through z—z and the plane of direction of the radio receiving apparatus when disposed at an angle to the vertical as shown in Figs. 5 and 7.

The operation of my device is most clearly understood by first considering Figs. 1, 2, 3, 4, 5, and 6. Returning to the preliminary description of the aviators problem in localizing or locating the station, that is to say, his landing field, the development of the idea of this invention will be noted. Assume as in Fig. 1 that the plane of direction of the radio receiving apparatus is determined by the vertical and lateral axes of the airplane. Assume the pilot to be approaching his radio station he will pass over or to one side of the radio station as before described. For some brief period of time as he passes such station the origin or source of radio energy, that is to say, said station will be in the plane of direction for operation determined by his radio receiving device as disposed on the ship. After passing the station and getting out of contact with radio communication issuing therefrom he will turn and pass the station again somewhat to one side of it. He again receives communication that his plane of direction is intercepting the station. This indication lasts but a few seconds. Realizing he has passed the station he wishes to determine whether the station is to his right or left and will swing well to the right or to the left and will find which of said motions will permit him to pick up the communication. Swinging gradually to the direction thus indicated he will find by making a uniform turn flying level he can hold the plane of direction of his receiving apparatus in constant communication with the ground station. The turn as he would thus make would become a circle to center directly above the ground station. He thus has information more definite than he had before, that is to say, that the station is directly below the center of a circle over which he has flown. The diameter of this circle is constant, and in order to hold the plane of direction of his radio receiving apparatus in such a position as to intercept the station it is necessary that the longitudinal axis of the machine be kept tangent to the radius of the circle.

Now by revolving the plane of direction of the radio receiving apparatus on the airplane through a small angle, say 15° for instance, on its vertical axis he again proceeds until his plane of direction intercepts the station. Knowing that the station is now 15° ahead of the lateral axis or behind the same, depending on the way he has turned, he is aware his longitudinal axis is now making an angle of 15° with the tangent instead of coinciding thereto when siding therewith as before. His path of flight will not be a circle but will take the form of an involute spiral in the level plane at which he is flying and will gradually approach the center of the circle. After some practice and study of the given type of airplane the pilot can estimate with considerable degree of accuracy the radius of his turn by the degree of his bank for as this radius of turn grows less his bank increases. It is assumed of course that the proper principles of flying are followed and the airplane flown true in the air stream.

It will be seen that by the foregoing means a point theoretically immediately above the station can be located in the level plane in which he is flying and can be approached in the same plane to a definite maneuver consisting of a uniform rate of change of controls and "feel" of the airplane. By so arranging the plane in the direction as shown in Fig. 3 it will be seen how a point can be localized in a plane or in two dimensions. Fig. 5 shows the plane of direction of the radio receiving apparatus to include the lateral axis of the aircraft and to be tilted at an angle to the longitudinal and vertical axes of said plane. The degree of this rotation about the lateral axis will be determined by the type of plane and load being carried. Such an arrangement will provide for maintaining a constant or uniform rate of descent if such plane of direction is kept as in the preceeding case in constant communication with the source of radio energy.

In Fig. 7 the plane of direction of the radio receiving device is shown embodying the two arrangements as shown in Figs. 3 and 5, thus providing means for gradually circling and converging toward the station as well as descending to the same from a higher altitude.

It is pointed out that the plane of air established by radio loops as shown are essentially transverse to the longitudinal axis of the plane, and that such an arrangement provides that in landing the aircraft will be gradually circling the field, and that upon emerging from the clouds it will be in a favorable position to make a landing. The radio receiving means will necessarily be of the type whose plane of direction is variable with the will of the pilot.

I claim:

1. In an aircraft radio means enabling the pilot to guide an aircraft through an involute spiral in three dimensions to a source of radio communication, said means comprising radio receiving apparatus so adapted that its plane of direction is at an angle to the lateral and vertical axes.

2. In combination with an aircraft body, a fixed coil receiving means for guiding a pilot to ground, said coil having its axis obliquely disposed with respect to said aircraft body.

3. In combination with an aircraft body, a fixed coil receiving means for guiding a pilot to ground, said coil having its axes obliquely disposed with respect to the longitudinal axis of said aircraft body.

4. In combination with an aircraft in flight, a radio receiving coil means fixedly held with the axis of the coil of said coil means in oblique relationship with respect to the path of flight of said aircraft.

5. In combination with an aircraft in flight, a source of radio signaling and a radio receiving coil means fixedly held with the axis of the coil of said coil means in oblique relationship with respect to the path of flight of said aircraft, the effective plane of the radio receiving coil means being substantially in the direction of the source of the sending station.

In testimony whereof I have affixed my signature.

CLARENCE CURTIS CULVER.